Nov. 10, 1959  E. K. STILBERT, JR., ET AL  2,912,393
INTUMESCENT COATING COMPOSITION AND
ARTICLES COATED THEREWITH
Filed Dec. 24, 1958
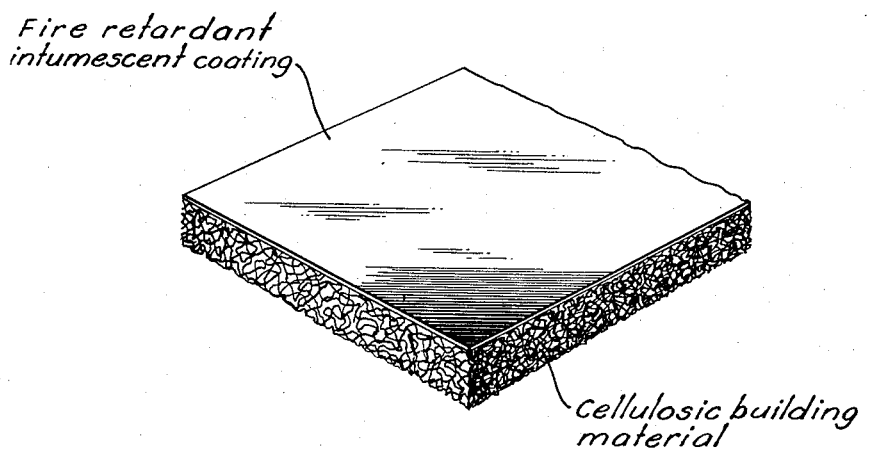
Fire retardant intumescent coating
Cellulosic building material
INVENTORS.
Elmer K. Stilbert, Jr.
Ira A. Cummings
Gerald E. Clock
BY Griswold & Burdick
ATTORNEYS United States Patent Office 2,912,393
Patented Nov. 10, 1959

2,912,393

INTUMESCENT COATING COMPOSITION AND ARTICLES COATED THEREWITH

Elmer K. Stilbert, Jr., Ira James Cummings, and Gerald E. Clock, Midland, Mich., assignors to The Dow Chemical Company, Midland, Mich., a corporation of Delaware Application December 24, 1958, Serial No. 782,967

9 Claims. (Cl. 260—17.4)

This invention concerns an improved intumescent coating composition and a wall member, such as fiber-board coated therewith.

This application is a continuation-in-part of U.S. Serial No. 594,204, filed June 27, 1956.

Intumescent coating compositions have been applied in the past to combustible materials such as fiber-board for protection against fire. Some of these compositions are disclosed in U.S. Patents 2,452,054, 2,523,626 and 2,566,964. All of these coating compositions depend on formaldehyde, or some other reactive material to form a resin which may serve as a binding agent. The presence of reactive substances causes several disadvantages such as a narrow operative pH range and a short wet stable life of the formulated compositions. These previous coatings generally exhibit poor resistance to washing and scrubbing operations.

The provision of an intumescent fire-retardant coating with improved flexibility and resistance to washing and scrubbing operations is the principal object of this invention.

A further object is the provision of an intumescent fire-retardant coating composition based on non-reactive materials.

Still another object is the provision of an intumescent coating with an improved wet storage life.

Another object is to provide a fibrous wall member coated with a scrub-resistant, intumescent, fire-retardant coating.

The above and related objects are accomplished by this invention in which a combustible building material is provided with an abrasion-resistant, intumescent coating deposited from a 40 to 60 percent aqueous dispersion of a mixture consisting of non-film forming intumescent solids and an aqueous, film-forming, latex-like dispersion of the polymerizates of certain esters of acrylic and methacrylic acid. The non-film forming intumescent solids consist of a foam-forming substance or spumific, a non-resinous carbon yielding substance or carbonific, and an organic nitrogen compound.

Materials suitable as non-resinous carbonifics are carbohydrates, modified starches and similar substances, a water dispersible protein such as gelatin or casein, or a polyhydric compound from the class consisting of the hexitols, such as mannitol, the pentitols such as arabitol, or the mono-, or di-tetritols such as mono and di-pentaerythritol. It is also possible to use a mixture of two or more of the above-mentioned products. It is preferred to use pentaerythritol or the dimer of pentaerythritol, or mixtures of the two for the non-resinous carbonific. Commonly the commercial grades of monopentaerythritol contain minor amounts of the dimer.

While an organic nitrogen compound is not entirely essential, improved intumescence is obtained from a composition containing one. Amino compounds such as dicyandiamide, urea, dimethyl urea, guanylurea phosphate, and glycine are suitable organic nitrogen compounds. Of these, urea or dicyandiamide are preferred as the organic nitrogen compound.

At temperatures at or near the temperature of combustion of wood, the non-resinous carbonific and organic nitrogen compound in combination with a foam-producing agent, or spumific, forms a fire resistant carbonaceous foam. The spumifics that may be used in this invention are preferably monoammonium phosphate, diammonium phosphate, phosphoric acid, ammonium sulfate, sulfamic acid, ammonium sulfamate, ammonium bromide, sodium tungstate, or sodium borate.

The carbonific may be present in amounts of from 10 to 70 percent of the weight of spumific and preferably 35 to 45 percent. When starch is used as a part of the carbonific, it is preferred to maintain the amount of starch at less than 15 percent of the weight of the spumific. When the amount of starch used is appreciably above 15 percent, both the intumescent rating and the scrub resistance of the coatings is noticeably decreased. The organic nitrogen compound may be present in amounts of from 0 to 55 percent of the weight of the spumific, but the preferred range is 5 to 20 percent. The spumific should form about 30 to 80 percent of the weight of the non-resinous intumescent solids. When more spumific is used, the walls of the heat-generated foam are fractured by excessive gassing of the spumific. When the non-resinous carbonific is more than the stated amount, insufficient spumific is present to form the deep foam needed for insulating the combustible coated material. When an excess of the organic nitrogen compound is used, the amount or degree of intumescence is again too low. The amounts that are to be used in any given coating to provide the maximum intumescence may be determined by simple preliminary experiments.

Such compositions, when employed without further modification, lack resistance to abrasion. Therefore, a polymer latex of esters of acrylic or methacrylic acid, usually of about 50 percent solids, is incorporated into the coating composition as a binder, so that the amount of the latex solids in the composition is from 5 to 35 percent of the total solids, but preferably from 15 to 30 percent. By esters of acrylic or methacrylic acid it is meant to include the polymerizates resulting from the alkyl esters of either acrylic acid or methacrylic acid wherein the alkyl group contains from 1 to about 8 carbon atoms. Representative of the aforementioned esters are ethyl acrylate, butyl acrylate, 2-ethylhexyl acrylate, methyl methacrylate and others wherein alkyl groups contained from 1 to 8 carbons. It is also intended to include the binary and ternary copolymerizates containing a characterizing amount of at least 5 percent by weight of one or more of said alkyl esters of acrylic or methacrylic acid together with another copolymerizable ethylenically unsaturated comonomer. Typical of such comonomers may be mentioned vinyl chloride, vinylidene chloride, vinyl toluene, vinyl acetate, styrene or similar comonomers. As is known in the art, some latexes will form films of unplasticized polymer, while others require a plasticizer to be film-forming. The nature and amount of any plasticizer required to render a latex film-forming will be known or may be easily determined by simple preliminary experiment. Likewise some latexes will form films by air drying alone while others require a short thermal fusion.

The latex may be prepared by any of the known procedures for polymerization in aqueous emulsion. Typically the monomer or monomers are added to an aqueous solution of a polymerization catalyst such as potassium persulfate or hydrogen peroxide and a surface active agent capable of emulsifying the monomers. Many suitable surface active agents are known to the art. The polymerizable mixture is agitated to effect emulsification and polymerization is initiated by heating the emulsified mixture usually between 35° and 100° C. The surface active agent is usually employed in an amount corresponding to from 0.5 to 5 percent of the weight of the polymerizable organic compounds. The polymerization catalyst is usually added in an amount corresponding to from 0.5 to 5 percent of the monomers. After polymerization is complete the resulting latex is filtered and if necessary to make it film-forming, about 10 percent plasticizer based on the weight of non-volatile solids in the latex is thoroughly stirred into the latex. With those latexes which are not good film-formers it is sometimes advantageous to add a small amount of a thickening agent to enhance their film-forming characteristics. Such thickening agents are usually hydrophilic colloids such as low viscosity methyl cellulose or sodium alginate. It is a conventional practice in the latex art to stabilize some latexes for storage or mechanical stability by the addition following polymerization of a small amount of a wetting agent.

In preparing the new coating composition, the various inert ingredients are initially mixed and ground together for several hours in a pebble mill, adding sufficient water to form a mixture of about 50 percent solids content. By inert ingredients are meant those materials such as suspending pigments, dyes, fungicide or bactericides which may be desired in the coating for an effect such as color or mildew proofing, not associated with the flame-resistant characteristics of the coating. Examples of suitable suspending agents or dispersants are gum tragacanth, gum arabic, Irish moss and the like. Suitable well-known substances to counteract the fermentation of the carbohydrate or protein carbonific and the growth of fungi are sodium pentachlorophenolate, beta-naphthol, copper fluoride or other copper salts, boric acid, borax, zinc salts, fluorides, arsenates, arsenites and the like. To the pigment slip so-formed from the inert ingredients may be added the spumific and carbonific. The desired latex is finally stirred in for a short time. A smooth stable composition containing about 50 percent total solids results.

The new coating composition, prepared in this manner are by weight. All of the compositions were made by the aforementioned procedure in which the inert ingredients were ground in a pebble mill for 3 hours with sufficient water to form a mixture of about 55 percent solids content. To the resulting pigment slip containing the inert ingredients, 22 parts of pentaerythritol, 56 parts of monoammonium phosphate, and 10 parts dicyandiamide were added with stirring. Subsequently, the latex was added and mixed with the other ingredients for 10 minutes.

Each of the compositions was sprayed evenly over the surface of 12 inch square panels (⅜ inch thick) of low density previously uncoated fibrous wall-board. The coated panels were dried at 158° F. for ten minutes followed by a 5 minute period at 302° F. The dry coated panels were then aged 16 to 20 hours at 75° F. and 50 percent relative humidity. These panels were then exposed to flame in a standard fire test to determine the degree of intumescence and the area of surface char of each coating. The fire test consisted of exposing the coated surface of the panel, inclined at an angle of 45 degrees, to the complete burning of 1 cc. of absolute alcohol, the alcohol flame being focused on the board at a point about 2 inches above the lower end of the panel. This fire test is described in Commercial Standard CS–42–49, U.S. Dept. of Commerce Bulletin, "Structural Fiber Insulating Board" (4th ed.) The amount of protection that each coating composition provides for each panel is rated according to amount of intumescence and area of surface char. Maximum fire retardant qualities are shown by those coatings which provide excellent intumescence (maximum depth of foam after exposure to flame) and minimum area of surface char. In addition, a 4 inch by 12 inch strip was cut from the uncharred portion of each of the coated panels and these were tested for scrub or abrasion resistance using the "Gardner Straight Line Scrub Tester—Model 105" (obtained from the Gardner Laboratory Inc., Bethesda, Maryland) and using in conjunction therewith a 0.5 percent aqueous soap solution. The number of cycles required to expose 10 percent of the panel's surface was determined.

*Table I*

| Monomer | Copolymer | | Percent Comonomer | Intumescent Rating [1] | Char Area | Scrub Resistance [2] |
|---|---|---|---|---|---|---|
| | Percent Monomer | Comonomer | | | | |
| None (for comparison) | | None | | 4 | 5.0 | 20 |
| Vinyl Chloride | 40 | 2-ethylhexyl acrylate | 60 | 4 | 9.3 | 60 |
| Methyl Methacrylate | 55 | ----do---- | 45 | 3.0 | 6.8 | 150 |
| Ethyl Acrylate | 60 | Methyl methacrylate | 40 | 3.0 | 7.8 | 370 |
| Vinylidene Chloride | 85 | Ethyl Acrylate | 15 | 4 | 9.0 | 400 |
| Vinyl Toluene | 55 | 2-ethylhexyl acrylate | 45 | 3 | 8.2 | 1,000 |

[1] 0=no intumescence; 1=very slight intumescence; 2=poor intumescence; 3=fair intumescence; 4=good intumescence; 5=excellent intumescence.
[2] Equals number of wet scrub cycles to expose 10% of the board's surface.

may be applied to any combustible building material to impart fire-retardant properties and to provide the material with a coating that is sufficiently resistant to abrasion to permit thorough washing without significant loss of the protective coating. The new composition may be applied by roller, brush, or spray application. When the the coating is applied at the mill where the fiber-board is made, the coated article is usually dried by a heat treatment at a temperature of about 50° C. to 200° C. A coated board prepared in this manner is fire-retardant and its coating is substantially resistant to abrasion encountered in normal use or in washing operations. In the appended drawing is illustrated a normally flammable cellulosic building material such as a fiber-board coated with the fire-retardant intumescent coating of this invention.

As further illustration of the invention, the following examples are offered in tabular form in which all parts The compositions of this invention can be seen to provide almost as good fire retardant qualities as the comparative composition containing no latex. In addition, the compositions provide outstanding scrub resistance to the coatings.

Similar results were obtained when latexes of ternary polymers, such as the ternary of vinyl chloride, vinylidene chloride, and ethyl acrylate, the ternary of 2-ethylhexyl acrylate, methyl methacrylate, and styrene, and the ternary of butadiene, vinyl toluene, and ethyl acrylate, were employed.

What is claimed is:

1. An intumescent coating composition comprising a 40 to 60 percent aqueous dispersion of a mixture consisting of 70 to 85 percent of non-film forming intumescent solids and enough of an aqueous film forming latex of a polymeric compound containing a characterizing amount of at least 5 percent by weight of a monomeric compound selected from the group consisting of an alkyl acrylate and an alkyl methacrylate wherein said alkyl group in each instance contains from 1 to 8 carbon atoms, any balance of said polymeric compound being a copolymerizable ethylenically unsaturated monomer, to provide correspondingly from 30 to 15 percent of the polymer solids, based on the total weight of solids present; said intumescent solids consisting essentially of (1) a foam forming ingredient selected from the group consisting of monoammonium phosphate, diammonium phosphate, phosphoric acid, ammonium sulfate, sulfamic acid, ammonium sulfamate, ammonium bromide, sodium tungstate, and sodium borate; (2) from 10 to 70 percent, based on the weight of the foam forming ingredient of at least one polyhydric compound from the class consisting of starch, the hexitols, the pentitols and the mono- and ditetritols, the amount of any starch employed being less than 15 percent of the weight of said foam forming ingredient; and (3) not more than 55 percent based on the weight of the foam forming ingredient, of an amino compound from the group consisting of glycine, urea, dimethyl urea, guanyl urea, guanidine and dicyandiamide.

2. The composition as claimed in claim 1 wherein the latex is one of about 50 percent solids.

3. The composition as claimed in claim 1 wherein the organic nitrogen compound is urea.

4. The composition as claimed in claim 1 wherein the organic nitrogen compound is dicyandiamide.

5. The composition as claimed in claim 1 wherein the polyhydric compound comprises dipentaerythritol.

6. The composition as claimed in claim 1 wherein the polyhydric compound comprises a mixture of starch and pentaerythritol.

7. As an article of manufacture, a normally combustible building material coated with the dry abrasion resistant composition claimed in claim 1 to render the article fire retardant.

8. A cellulosic building material coated with the composition claimed in claim 1.

9. A fiber-board coated with the composition of claim 1.

No references cited.